United States Patent
Li et al.

(10) Patent No.: US 7,656,873 B2
(45) Date of Patent: Feb. 2, 2010

(54) METHOD, A USER TERMINAL AND A SERVER FOR OBTAINING ACCESS LOCATING INFORMATION

(75) Inventors: Jun Li, Guangdong Province (CN); Jiahong Wei, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 11/579,263

(22) PCT Filed: Apr. 25, 2006

(86) PCT No.: PCT/CN2006/000785

§ 371 (c)(1),
(2), (4) Date: Jul. 18, 2008

(87) PCT Pub. No.: WO2006/116912

PCT Pub. Date: Nov. 9, 2006

(65) Prior Publication Data

US 2009/0003330 A1    Jan. 1, 2009

(30) Foreign Application Priority Data

Apr. 30, 2005    (CN) .................. 2005 1 0034521

(51) Int. Cl.
*H04L 12/28* (2006.01)
*H04L 12/56* (2006.01)
*G06F 15/177* (2006.01)
*G06F 15/173* (2006.01)

(52) U.S. Cl. ..................... 370/392; 709/220; 709/223

(58) Field of Classification Search .............. 370/389, 370/392; 709/220, 223

See application file for complete search history.

(56) References Cited

U.S. PATENT DOCUMENTS

2001/0047407 A1 * 11/2001 Moore et al. ............. 709/223

(Continued)

FOREIGN PATENT DOCUMENTS

CN          1601988 A        3/2005
WO    WO 2005079000 A1 *    8/2005

OTHER PUBLICATIONS

Supplementary European Search Report from European Application No. 06741716.

(Continued)

*Primary Examiner*—Ronald Abelson
(74) *Attorney, Agent, or Firm*—Finnegan, Henderson, Farabow, Garrett & Dunner LLP (57) ABSTRACT

A method of a user terminal obtaining its access location information in next generation network, and a user terminal, and a server having function of Dynamic Host Configuration Protocol (DHCP) function are disclosed. DHCP is extended by adding a new DHCP option to carry the user terminal access location information; when the user terminal accesses to network, DHCP server puts the DHCP option into DHCP response message; receiving the DHCP response message, the user terminal obtains the access location information from the DHCP option. The present invention overcomes the shortcoming of the prior art that when a terminal nomadizes or roams from one access network to another, the access network information configured on the terminal has to be updated manually and thus results in redundant workload and inflexibility, the user terminal is allowed to obtain its access location information automatically, hence nomadicity or roaming of the user terminal is supported.

17 Claims, 7 Drawing Sheets

U.S. PATENT DOCUMENTS

| | | |
|---|---|---|
| 2003/0101217 A1 | 5/2003 | Aiyoshi et al. |
| 2003/0172307 A1 | 9/2003 | Henry et al. |
| 2005/0013280 A1* | 1/2005 | Buddhikot et al. ........... 370/349 |
| 2005/0068969 A1 | 3/2005 | Park et al. |
| 2006/0161663 A1* | 7/2006 | Palm .......................... 709/227 |

OTHER PUBLICATIONS

"NGN Functional Architecture" ETSI Standards, European Telecommunications Standards Institute, Sophia-Antipo, FR. No. V022, 2004, XP014029888 ISSN: 0000-0001.

Li Jun Huawei: "DHCP Option for CLF/NASS" IETF Standard-Working-Draft, Internet Engineering Task Force, IETF, CH, Jun. 15, 2005, XP015040448 ISSN: 0000-0004.

Schulzrinne Columbia University H: "Dynamic Host Configuration Protocol (DHCP-for-IPv4) Option for Session Initiation Protocol (SIP) Servers" IETF Standard, Internet Engineering Task Force, IETF, CH, Aug. 2002, XP015009120 ISSN: 0000-0003.

International Search Report from corresponding International Application No. PCT/CN2006/000785, filed Apr. 25, 2006.

* cited by examiner

METHOD, A USER TERMINAL AND A SERVER FOR OBTAINING ACCESS LOCATING INFORMATION

FIELD OF THE INVENTION

This invention relates to communication technology, particularly to a method, a user terminal and a server for obtaining access location information.

BACKGROUND OF THE RELATED ART

Figure 1:
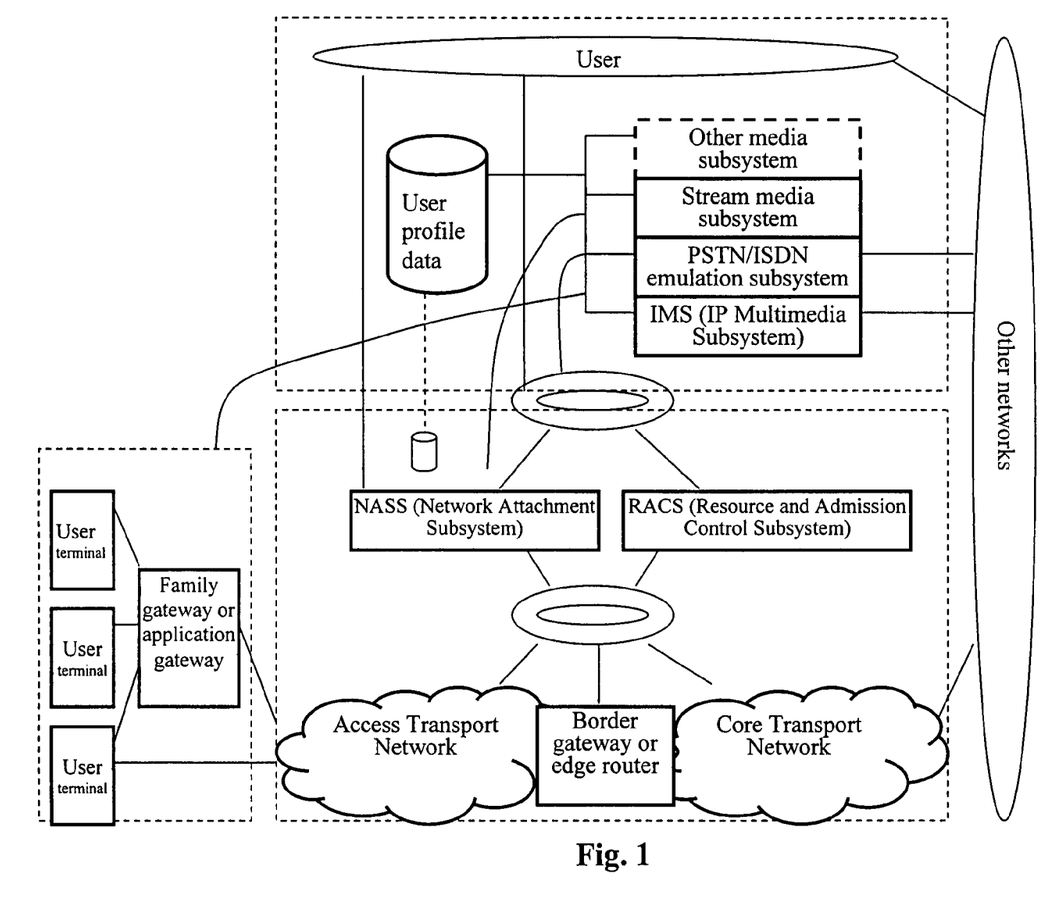
FIG. 1 is a schema view of NGN network architecture.

Currently, ITU-T and ETSI, respectively as international and European telecommunication standards organizations, are developing network architecture of NGN (Next Generation Network). The ETSI TISPAN NGN architecture is shown in FIG. 1. Based on this NGN architecture, NGN can be divided into three main parts: service control and applications part, the network bearing part, and terminal part, and the functions of the three main parts are respectively described as follows.

Service control and applications system, including IP multimedia subsystem (IMS), PSTN/ISDN emulation subsystem, stream media subsystem, completes service control function of various applications and provides various services.

Network bearing system, includes the following subsystems:

(1) Network Attachment Subsystem (NASS): completes authentication and authorization, address allocation, user location information management and terminal configuration in the network access layer;

(2) Resources and Admission Control Subsystem (RACS): completes functions of transport network resources control, distribution, and management based on service requirement, and guarantees quality of service;

(3) Transport Subsystem: under control of the above subsystems, completes transportation of various kinds of network datagram; includes the Access Transport Network and Core Transport Network shown in the figure.

User terminal: includes various NGN terminals and user family network equipments, comprising family gateway, IAD (Integrated Access Equipment), STB (Set Top Box), Video-Phone, PC, WiFi (Wireless Fidelity) handset etc.

Figure 2:
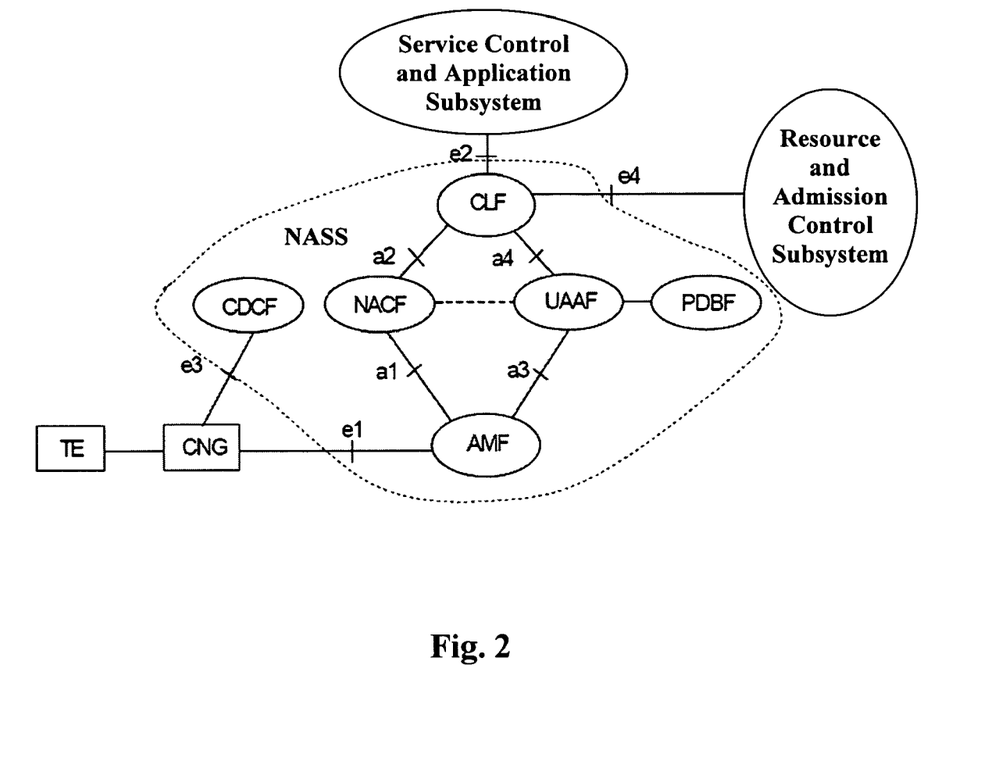
FIG. 2 is a schema view of the Network Attachment Subsystem.

Network Attachment Subsystem (NASS) is shown in FIG. 2, including the following functional entities:

(1) AMF—Access Management Function.

(2) NACF—Network Access Configuration Function, is generally implemented as a DHCP server (Dynamic Host Configuration Protocol server) for DHCP access.

(3) CLF—Connectivity Session Location and Repository Function, provides interface from CLF to service system.

(4) UAAF—User Access Authorized Function.

(5) PDBF—Profile Data Base Function.

(6) CDCF—Client Devices Configuration Function.

In the NGN architecture, by introducing NASS and RACS, the difference between the transport subsystems in the underlayer is covered, and a uniform standard interface is provided upwardly. Based on this architecture, service can be separated from access, that is, NGN service providers do not need to pay attention to the detailed differences between underlayer transport subsystems, but only need to provide a standard interface for connecting to access network operator; and access network operators do not need to concern how to provide detailed NGN service either, but only need to provide a standard interface through NASS and RACS, and then NGN service providers can provide NGN service with QOS guarantee using resources of transport networks.

Figure 3:
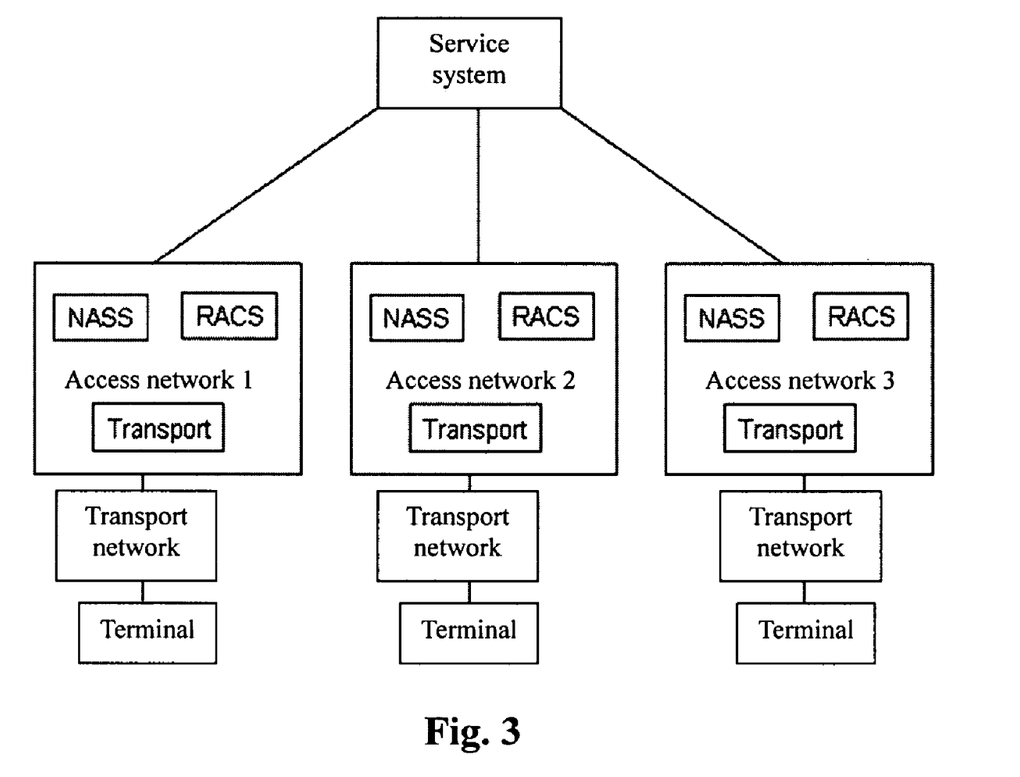
FIG. 3 is a schema view of user terminals accessing a service system through different access networks.

Thus, a service system can serve a number of different broadband access networks (a service system can be a service control and application subsystems, or a specific network application, such as IMS (IP Multimedia System), IPTV (IP Television system), or a network game), that is, a user can access a network through different access network operators, and nomadizes or roams among multiple access networks (nomadicity means that a network user switches from a network to another network and the service is interrupted during switching; while in roaming, service is uninterrupted during switching; roaming is usually applied in mobile networks while nomadicity is applied in fixed or semi-mobile networks such as WiFi, DSL applications). The architecture for terminals accessing a service system through different access networks is shown in FIG. 3, wherein a user can obtain corresponding service no matter through which access network. Thus it requires that, when the user registers to service system or submits service request, service system can obtain relevant information of the user from NASS of the user's access network, apply and reserve network bandwidth/QOS resource through RACS of the access network, so as to ensure effective services.

Because users can roam across a number of access networks, service operators need to know the location information (visiting location information) of their users. Through obtaining the information, the service system can control QOS precisely, and provide different fee charge strategies (local, long-distance and roaming) and location information services etc. However, the problem is that, a terminal usually does not know its own access location information when it accesses a network. Because the terminal directly registers to or requests service from a service system, the process is transparent to the access network, when the terminal registers to a service system, the service system does not know what network the user is accessing if the access location information cannot be carried by the user terminal, the service system of course does not know from which network to get the user's relevant information and consequently cannot implement the corresponding QOS control.

The solution in prior art is that the access network information is configured on the terminal in advance, and the terminal registers the information to a service system at the time of accessing to the service system, then based on the information, the service system can retrieve the user's information from corresponding access network and implement QOS control.

SUMMARY OF THE INVENTION

The present invention provides a method of obtaining access location information and the corresponding user terminal and server, so that the user terminal can automatically obtain its access location information. The invention may overcome the shortcoming of the prior art that the access network information configured on the terminal cannot be updated automatically when the terminal nomadizes or roams from one access network to another.

A method of obtaining access location information according to the present invention comprises the following steps:

extends Dynamic Host Configuration Protocol (DHCP) by adding a new DHCP option or redefine an existing option, the DHCP option being utilized to carry the access location information of the user terminal;

when the user terminal accesses a network and sends a request, the server puts the DHCP option into a response message; and the user terminal receives the DHCP option and obtains the access location information from the DHCP option.

The user terminal first requests the server to provide the access location information of the user terminal through a DHCP Discover message, a DHCP Request message or a DHCP Inform message, and then the server returns the user terminal the DHCP response message carrying the DHCP option.

The DHCP response message may be a DHCP offer message or DHCP Ack message.

The access location information carried by the DHCP option comprises one or more items of the following: the access operator identifier, the user access network identifier, identifier or address of the Network Attachment Subsystems in the user access network, identifier or address of the Connectivity Session Location and Repository Function of the user access network, identifier or address of broadband remote access server to which the user accesses, identifier or addresses of access equipments to which the user access, identifiers of the physical line and logical link to which the user access.

The DHCP option comprises at least a type field and a content field, the type filed indicating it is the location information that is carried in the DHCP option, and the content field carrying the user terminal access location information.

The user terminal can request its access location information through a DHCP Discover message, the server answers the request from the user terminal with a DHCP Offer message in which the DHCP option is carried;

Alternatively, the user terminal may request the access location information through a DHCP Request message or a DHCP Inform message, the server answers the request from the terminal with a DHCP Ack message in which the DHCP option is carried.

A user terminal according to the invention comprises:
an access location information acquiring module, and
an access location information processing module,
the access location information acquiring module receiving the DHCP datagram carrying the access location information sent from the server, obtaining the access location information from the option in the DHCP datagram, and sending the information to the access location information processing module;

the access location information processing module preserving the access location information for using the information at the time of registering to service system or requesting service.

A server for providing access location information of user terminal, the server comprising:

An access location information processing module for preserving the user access location information for configuring the access location information on the user terminal;

A DHCP access location information transmitting module for putting the access location information, which is preserved by access location information processing module, into the access location information option in the DHCP datagram sent to the user terminal, and transmitting the information to the corresponding user terminal.

In the prior art, when a terminal nomadizes or roams from one access network to another, the access network information configured on the terminal has to be updated manually which results in redundant workload and inflexibility. In the solution of the present invention, DHCP is extended by adding a new DHCP option carrying user access location information. Without change to the network topology and configuration on the user terminal, the user terminal can automatically obtain its access location information by requesting message when it accesses the network. Alternatively, the request may not be needed, for the DHCP server can directly put the new added DHCP option in a DHCP response message and sent it to the user terminal. The user terminal can register the information to the service system, and thus ensure that the service system can obtain access location information of the terminal. This invention allows user terminal to obtain the current access location information when it accesses to different networks or different locations in the same network, hence nomadicity or roaming of user terminals is supported.

DETAILED DESCRIPTION OF THE PREFERRED EMBODIMENT

Hereafter, preferred embodiments according to the present invention will be described in detail with reference to the drawings.

DHCP (Dynamic Host Configuration Protocol) is a network protocol to configure relevant network parameters dynamically for users by adopting a mechanism which automates the assignment of related information to client. When a client accesses the system, the server can provide the client with the network configuration information including IP address, gateway, DNS server, etc. Client retrieves the information from the DHCP server. In a large integrated network, DHCP is a protocol frequently used for users to access the network, by which the server can automatically configure network parameters such as IP address, etc. The following example in which a user communicates with a server using DHCP, describes the method of obtaining access information and the corresponding equipments according to an embodiment of the invention.

Figure 4:
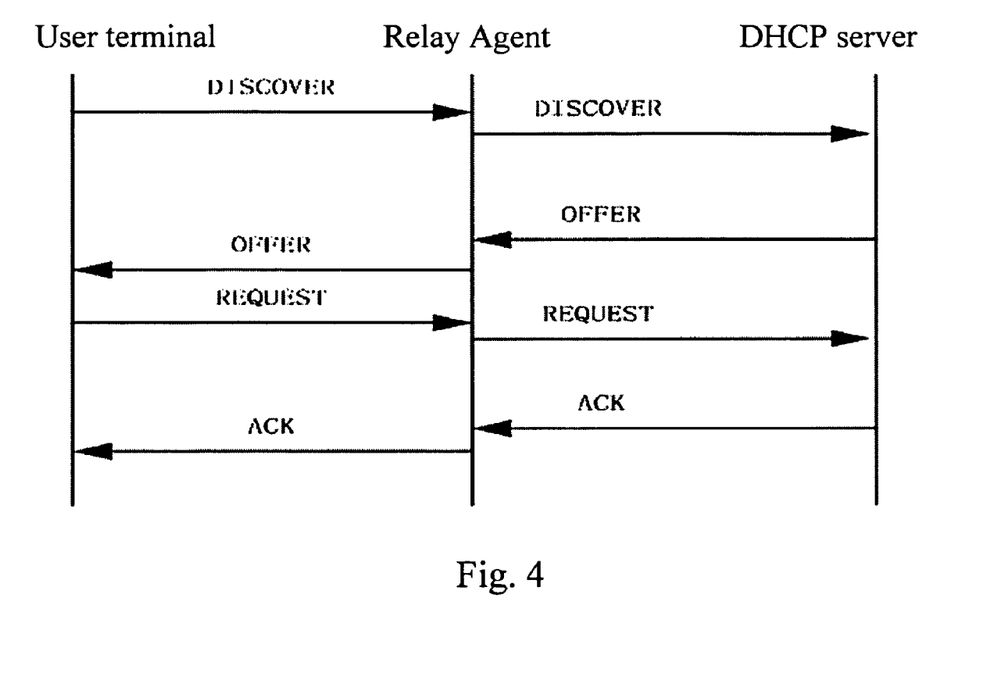
FIG. 4 is a flow chart of standard DHCP interaction.

The standard DHCP interaction flow chart is shown in FIG. 4, when a terminal accesses a network, it obtains information such as IP address, subnet mask, DNS etc. through DHCP, and this process is performed upon a request from the terminal to the DHCP server (NASS component). The user terminal requests the DHCP server through DHCP Discover message, DHCP Request message or DHCP Inform message, the DHCP server returns DHCP Offer message and DHCP Ack message to the user terminal. DHCP datagram can carry various DHCP options, and these options can carry various information, such as DNS server, SIP server, etc.

According to an embodiment of the present invention, DHCP is extended by adding a new DHCP option to carry access location information of the user terminal (or reuse an existing option, which means not define a new option but redefine an existing DHCP option), and the user terminal and network equipment having function of DHCP server can support the DHCP option. The option contains a dedicated code field, i.e., a type field, through which the user terminal can obtain the location information/visiting location information from network. The format of the DHCP option is shown as following:

| CODE | Length | Content |

The CODE field defines the type, indicating the option is for carrying the user terminal access location; Length defines the length of the option; the access location information of the user terminal is carried in the Content field of the option. The user access location information that can be carried in the DHCP option can be all or some of the following sub-options:

1. The access network operator identifier, for example "China telecom".

2. The user access network identifier, which can include the operator's information, and physical region information etc, for example "China Telecom Beijing DSL R101".

3. The identifier or address of the user access network's Network Attachment Subsystem (NASS), for example "China Telecom NASS 001" or "212.100.010.001".

4. The identifier or address of Connectivity Session Location and Repository Function (CLF) in the user access network, for example "China Telecom CLF 001" or "212.100.011.001".

5. The identifier or address of Broadband Remote Access Server (BRAS) to which the user access, for example "Beijing BRAS001" or "212.100.100.001".

6. The identifier or address of the access equipment to which the user access, for example "Beijing DSLAM1001" or "212.100.101.001".

7. The identifier of the physical line and logical link to which the user access, for example "Beijing DSLAM1001 eth 0/1/0/1:100" or "Beijing BRAS001 atm 0/1/0/1:0.35".

According to the standard DHCP interaction process described previously, only by transmitting DHCP Offer and/or DHCP Ack message carrying the option to the user terminal, the DHCP server can send the terminal's access location information/visiting location information to the user terminal.

Figure 5:
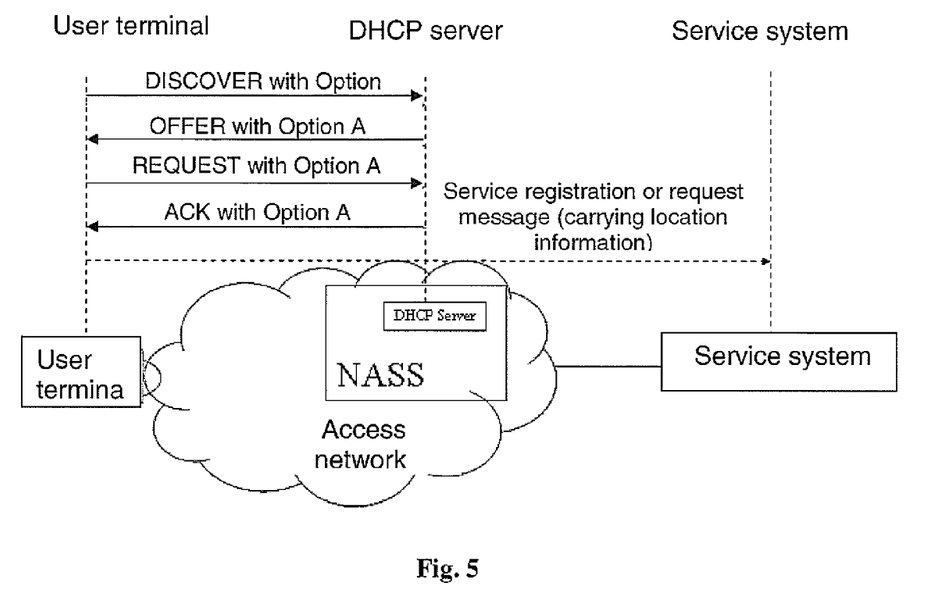
FIG. 5 is a flow chart of the user terminal obtaining the location information and submitting to service system according to an embodiment of the present invention.

FIG. 5 shows the flow chart of the user terminal obtaining location information and submitting it to service system according to an embodiment of the present invention. The DHCP option is handled as following:

1) The DHCP Server issues DHCP Offer and DHCP Ack messages carrying the new added DHCP option according to an embodiment of the present invention, the DHCP option carrying the user access location information which may include the user access location information sub-options as previously described.

2) The user terminal receives the DHCP Offer or DHCP Ack message carrying the DHCP option, and obtains the access location information. Since the access location information may contain a plurality of sub-options, the terminal can obtain all or some of these sub-options as desired.

3) The user terminal can register the information to service system; therefore ensure the service system can obtain the user terminal access location information.

The user terminal can request the option defined in the invention through a DHCP Discover message, the DHCP server answers the terminal's request with a DHCP Offer message carrying the user access location information in the DHCP option defined in the invention. The terminal can also request the option defined in the invention through a DHCP Request or a DHCP Inform message, the DHCP server answers the terminal's request with a DHCP Ack message carrying the user access location information in the DHCP option defined in the invention.

During the DHCP interaction process, the network equipment implementing DHCP Relay function (for example, Broadband Remote Access Server (BRAS) or Digital Subscriber Line Access Multiplexer (DSLAM)) handles the DHCP datagram with the DCHP option in the same way as handling DHCP datagram without the DHCP option. The network equipment does not alter the DHCP option when handling the datagram.

According to an embodiment of the present invention, DHCP is extended by adding a new DHCP option to carry user terminal access location information. Without change to the network topology and configuration on the user terminal, the user terminal can automatically obtain its access location information by requesting message when it accesses the network. Alternatively, the request may not be needed, for the DHCP server can directly put the new added DHCP option in a DHCP Offer or a DHCP Ack message and sent it to the user terminal. The user terminal can register the information to the service system, and thus ensure that the service system can obtain access location information of the terminal. This invention allows user terminal to obtain the current access location information when it accesses to different networks or different locations in the same network, hence nomadicity or roaming of user terminals is supported.

To implement the method according to the present invention, a user terminal and an equipment implementing function of DHCP server are also provided.

Figure 6:
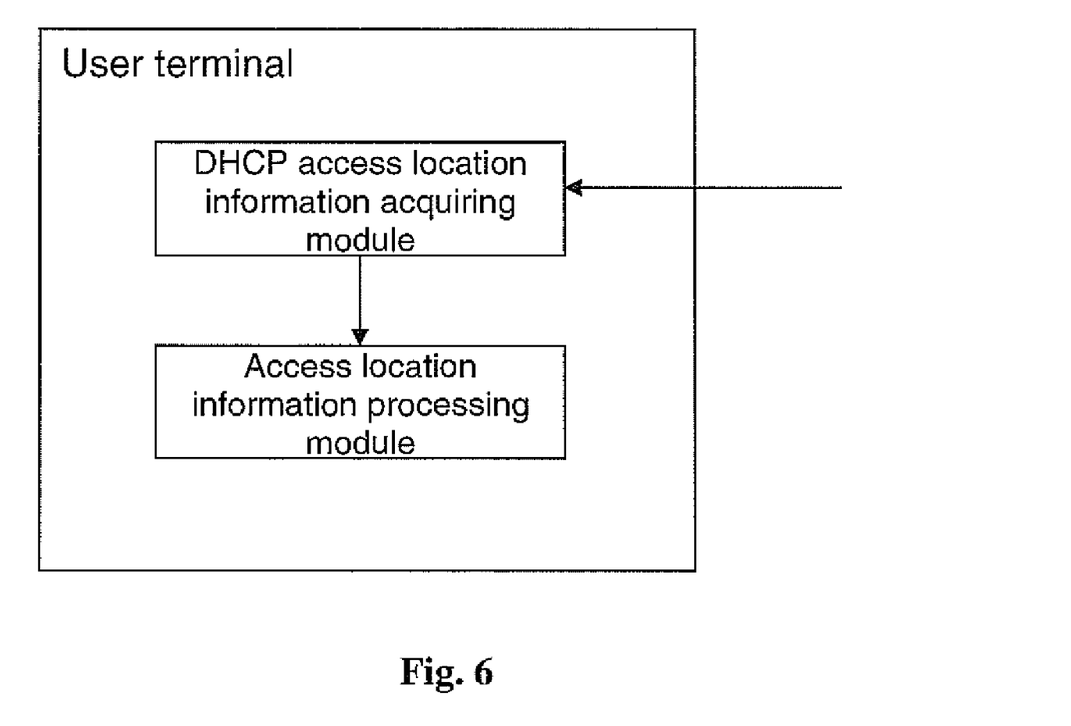
FIG. 6 is a schema view of the modules of the user terminal for implementation of the method according to an embodiment of the present invention.

FIG. 6 illustrates the modules of the user terminal for implementation of the method according to an embodiment of the present invention, wherein the user terminal comprises:

a DHCP access location information acquiring module; and an access location information processing module, the DHCP access location information acquiring module receiving DHCP datagram carrying the access location information from a DHCP server or other equipment implementing function of DHCP server, obtaining the access location information from the option in the DHCP datagram, and then sending the information to the location information processing module;

the access location information processing module locally preserving the access information for using the information at the time of registering to server system or requesting service.

Figure 7:
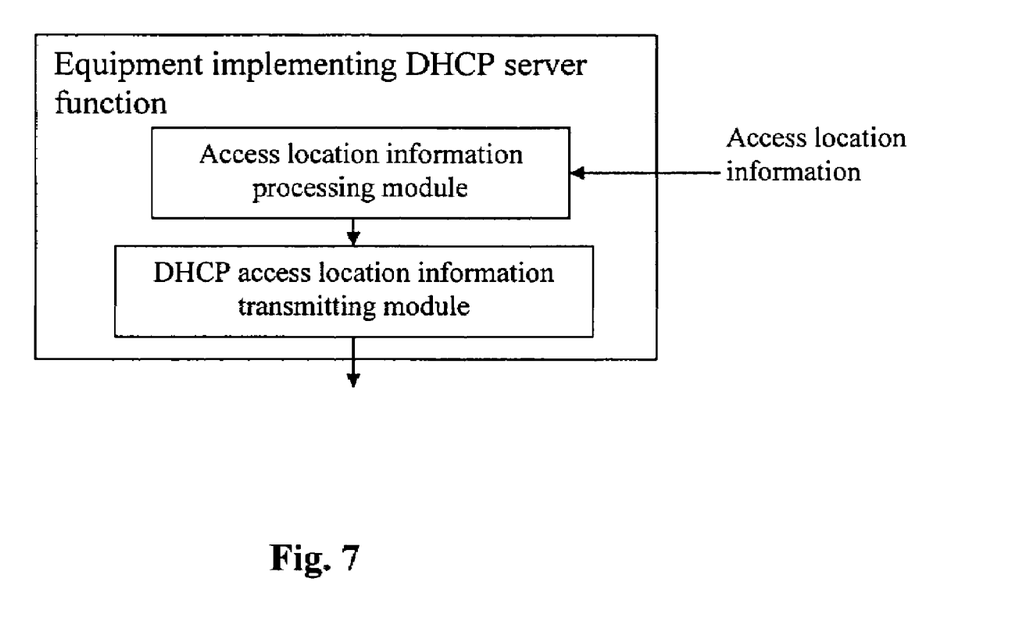
FIG. 7 is a schema view of modules of the equipment implementing function of DHCP server for implementation of the method according to an embodiment of the present invention.

FIG. 7 illustrates the modules of the equipment having function of DHCP server for implementation of the method according to an embodiment of the present invention, wherein the equipment comprises:

an access location information processing module for preserving the user access location information for configuring the access information on the user terminal;

an access location information transmitting module for putting the access location information, which is preserved by the access location information processing module, into the access location information option in the DHCP datagram sent to the user and transmitting the information to the corresponding user terminal.

If the network equipment supports embedded DHCP server function, then the equipment can implement the same functions as an independent DHCP server.

The invention provides a method of a user terminal obtaining its access location information, the user terminals and the network equipment in next generation network.

The above-described is only preferred embodiments of the present invention, and the scope of the present invention is not limited thereto. Modifications and alterations are easily imaged by those skilled in the art within the technical scope disclosed in the present invention, and should come within and protected by the scope of the present invention as set by the appended claims and its equivalents.

What is claimed is:

1. A method of obtaining access location information, comprising the following steps:
putting a Dynamic Host Configuration Protocol (DHCP) option into a DHCP response message when a user terminal accesses a network and sends a request message, wherein the DHCP option is configured to carry access location information of the network, and is obtained by adding a new DHCP option or redefining an existing DHCP option;
receiving the DHCP option at the user terminal and obtaining the access location information from said DHCP option,
wherein the access location information comprises one or more of the following: an access operator identifier, a user access network identifier, an identifier or address of the Network Attachment Subsystem in the user access network, an identifier or address of the Connectivity Session Location and Repository Function of the user access network, an identifier or address of broadband remote access server to which the user accesses, an identifier or address of the access equipment which the user accesses, an identifier of the physical line and logical link which the user accesses.

2. The method of obtaining access location information according to claim 1, wherein the user terminal requests the server to provide the access location information of the user terminal through a DHCP Discover message, a DHCP Request message or a DHCP Inform message, and the server returns the user terminal a DHCP response message carrying said DHCP option.

3. The method of obtaining access location information according to claim 2, wherein the DHCP response message comprises a DHCP Offer message or a DHCP Ack message.

4. The method of obtaining access location information according to claim 3, wherein said DHCP option comprises at least a type field and a content field, the type field indicating it is the access location information that is carried in said DHCP option, and the content field carrying the user access location information.

5. The method of obtaining access location information according to claim 3, wherein the user terminal requests its access location information through a DHCP Discover message, and the sewer answers the request from the user terminal with a DHCP Offer message in which said DHCP option is carried;
alternatively, the user terminal requests its access location information through a DHCP Request message or a DHCP Inform message, and the sewer answers the requests from the user terminal with a DHCP Ack message in which the DHCP option is carried.

6. The method of obtaining access location information according to claim 1, wherein the DHCP response message comprises a DHCP Offer message or a DHCP Ack message.

7. The method of obtaining access location information according to claim 6, wherein said DHCP option comprises at least a type field and a content field, the type field indicating it is the access location information that is carried in said DHCP option, and the content field carrying the user access location information.

8. The method of obtaining access location information according to claim 6, wherein the user terminal requests its access location information through a DHCP Discover message, and the server answers the request from the user terminal with a DHCP Offer message in which said DHCP option is carried;
alternatively, the user terminal requests its access location information through a DHCP Request message or a DHCP Inform message, and the server answers the requests from the user terminal with a DHCP Ack message in which the DHCP option is carried.

9. A user terminal comprising:
an access location information acquiring module;
an access location information processing module;
said access location information acquiring module is configured for receiving the DHCP datagram carrying the access location information from a server, obtaining the access location information from an option in the DHCP datagram, and sending the information to said access location information processing module; and
said access location information processing module is configured for preserving the access location information for using the information at the time of registering to service system or requesting service,
wherein the access location information comprises one or more of the following: an access operator identifier, a user access network identifier, an identifier or address of the Network Attachment Subsystem in the user access network, an identifier or address of the Connectivity Session Location and Repository Function of the user access network, an identifier or address of broadband remote access sewer to which the user accesses, an identifier or address of the access equipment which the user accesses, an identifier of the physical line and logical link which the user accesses.

10. The user terminal of claim 9, wherein the DHCP datagram comprises a DHCP Offer message or a DHCP Ack message.

11. The user terminal of claim 9, wherein the option in the DHCP datagram comprises at least a type field and a content field, the type filed is configured for indicating that the access location information is carried in the DHCP option, and the content field carrying the user access location information.

12. The user terminal of claim 9, wherein the option comprises a plurality of sub-options, the sub-options respectively correspond to the access operator identifier, the user access network identifier, the identifier or address of the Network Attachment Subsystem in the user access network, the identifier or address of the Connectivity Session Location and Repository Function of the user access network, the identifier or address of broadband remote access server to which the user accesses, an identifier or address of the access equipment which the user accesses, the identifier of the physical line and logical link which the user accesses; the access location information acquiring module extracts some or all of the sub-options as desired to obtain the access location information.

13. A method for obtaining access location information of an access network, comprising:

receiving, by a user terminal, a DHCP response message with access location information of the access network, wherein the access location information of the access network is carried in a DHCP option of the DHCP response message;

obtaining, by the user terminal, the access location information of the access network from the DHCP option; and providing, by the user terminal, the access location information of the access network to a service system, wherein the access location information comprises at least one selected from the group consisting of: an access operator identifier, a user access network identifier, an identifier or address of the Network Attachment Subsystem in the user access network, an identifier or address of the Connectivity Session Location and Repository Function of the user access network, an identifier or address of broadband remote access server to which the user accesses, an identifier or address of the access equipment which the user accesses, an identifier of the physical line and logical link which the user accesses.

14. The method of claim 13, wherein the DHCP response message comprises a DHCP Offer message or a DHCP Ack message.

15. The method of claim 13, wherein the DHCP option comprises at least a type field and a content field, the type filed is configured for indicating that the access location information is carried in the DHCP option, and the content field carrying the user access location information.

16. The method of claim 13, wherein the DHCP option comprises a plurality of sub-options, the sub-options respectively correspond to the access operator identifier, the user access network identifier, the identifier or address of the Network Attachment Subsystem in the user access network, the identifier or address of the Connectivity Session Location and Repository Function of the user access network, the identifier or address of broadband remote access server to which the user accesses, an identifier or address of the access equipment which the user accesses, the identifier of the physical line and logical link which the user accesses.

17. The method of claim 16, wherein obtaining the access location information from the DHCP option comprises: obtaining, by the user terminal, some or all of the sub-options of the DHCP option of the DHCP response message.

* * * * *

UNITED STATES PATENT AND TRADEMARK OFFICE
CERTIFICATE OF CORRECTION

PATENT NO. : 7,656,873 B2
APPLICATION NO. : 11/579263
DATED : February 2, 2010
INVENTOR(S) : Jun Li and Jiahong Wei It is certified that error appears in the above-identified patent and that said Letters Patent is hereby corrected as shown below:

In claim 5, column 7, lines 60 and 65, "sewer" should read -- server --

In claim 9, column 8, line 40, "sewer" should read -- server --

Signed and Sealed this
Twelfth Day of March, 2013

Teresa Stanek Rea
*Acting Director of the United States Patent and Trademark Office*